July 19, 1927.
S. D. ROBINS
CIRCUIT CLOSING DEVICE
Filed Nov. 30, 1921
1,636,245
2 Sheets-Sheet 1
FIG. I.
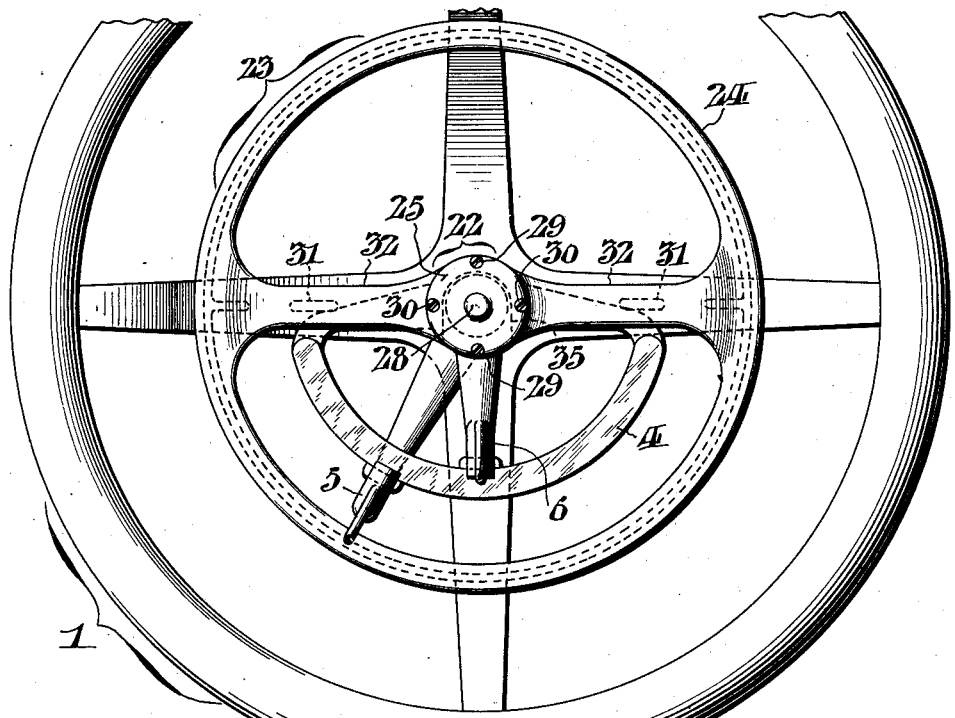
FIG. II.
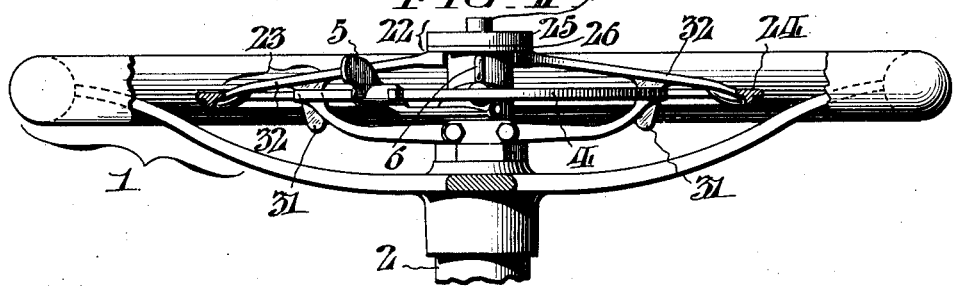
FIG. III.
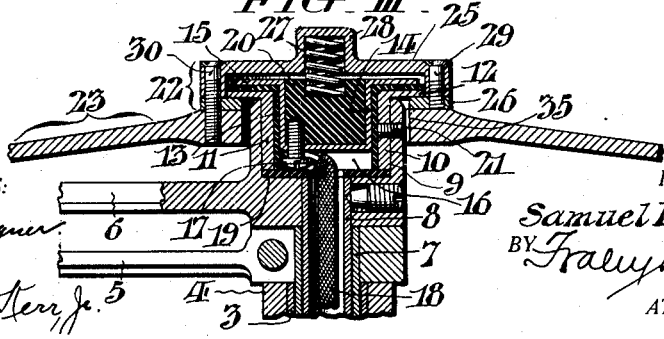
WITNESSES:
John C. Bergner
Thomas W. Kerr Jr.
INVENTOR:
Samuel Davis Robins,
BY Fraley Paul
ATTORNEYS.

July 19, 1927.
S. D. ROBINS
1,636,245
CIRCUIT CLOSING DEVICE
Filed Nov. 30, 1921
2 Sheets-Sheet 2
FIG. IV
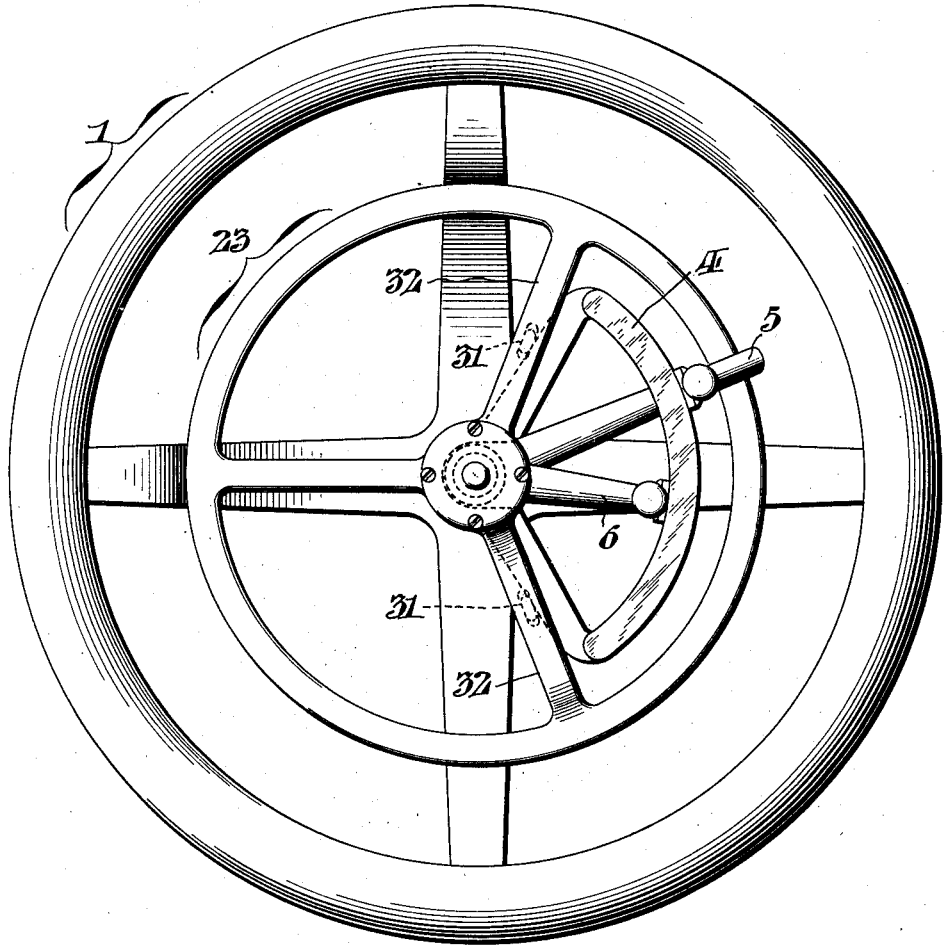
FIG. V
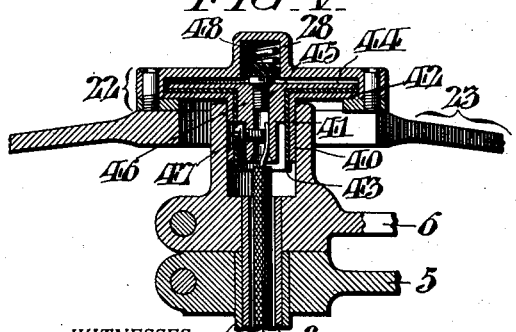
FIG. VI
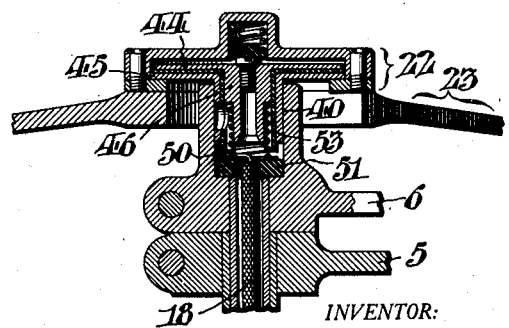
WITNESSES:
INVENTOR:
Samuel Davis Robins,
BY
ATTORNEYS.

Patented July 19, 1927.

1,636,245

UNITED STATES PATENT OFFICE.

SAMUEL DAVIS ROBINS, OF STAMFORD, CONNECTICUT.

CIRCUIT-CLOSING DEVICE.

Application filed November 30, 1921. Serial No. 518,814.

My invention relates to circuit closing devices of the kind more especially useful in connection with automobiles in controlling the operation of a horn or other warning signal.

The primary object of my invention is to make it possible to control the operation of an automobile horn or other warning signal without necessitating withdrawal of the hand or hands from the steering wheel. To this end I provide a structure which is extremely compact and neat in appearance; readily manufactured at a very moderate cost; and capable of being substituted in place of push buttons such as ordinarily provided at the centres of the steering columns.

Other objects and attendant advantages will be readily apparent from the detailed description of the typical embodiments of my invention which follows.

In the drawings, Fig. I is an illustration showing a circuit closing device conveniently embodying my invention in association with one of the standard forms of steering wheel and column assemblies of automobiles.

Fig. II is an elevation of the organization shown in Fig. I, a portion of the rim of the steering wheel being broken away so as to expose the parts within.

Fig. III is a fragmentary axial sectional view of the organization on a larger scale.

Fig. IV is an illustration similar to Fig. I, showing a circuit closing device of my invention as applied to another standard form of steering wheel and column assemblage.

Fig. V is an alternative form of member by which the circuit closing device is attached; and Fig. VI is a view similar to Fig. V, showing further modification of certain details.

Referring first to the organization shown in Figs. I, II and III, the numeral 1 indicates the steering wheel of an automobile, said wheel being mounted on the steering column 2 in the usual way. Within the column 2 is a stationary sleeve 3 to the top of which is fixed the guide sector 4 for the carbureter throttle lever 5 and the spark control lever 6. These levers 5, 6 are secured respectively to sleeves 7 and 8 independently rotatable within the steering column 2. The spark control lever 6 has in its hub, an axial cavity 9 ordinarily adapted to accommodate a push button for the actuation of the usual signal horn but which I employ for convenience in attaching my improved circuit closing device, as hereinafter explained. The parts thus far described are of typical or standard design and construction and form no part of the present invention.

The circuit closing device especially adapted to the steering column assembly just described comprises an attachment member in the form of a plug 10 having an outer metallic ferrule 11 with an annular projection or flange 12, see Fig. III. Secured within the ferrule 11, with interposition of insulation 13, is a metallic thimble 14 which affords an exposed horizontal annular contact surface 15. The body of the thimble 14 is of less depth than the ferrule 11 with consequent provision, when the parts are assembled, as in Fig. III, of a clearance space 16 for accommodation of the head of a screw 17, by which the end of a conductor 18 from the signal horn (not shown) is electrically connected to said thimble. Direct metallic contact of the head of the screw 17 with the bottom of the cavity 9 in the spark control lever 6 is prevented by a washer 19 of insulating material. The plug 10 may be readily secured in place by a set screw 21 furnished with the spark lever.

The annular projecting portion of the plug 10 is engaged within the hollow hub 22 of an actuating element 23 which is shown as lying approximately within the plane of the steering wheel 1 with its ring 24 positioned in close proximity to the wheel rim so as to be conveniently accessible to the operator without necessitating removal of the hands from said wheel. As illustrated, the hub 22 of the actuating element 23 is made as a separate member and comprises a cap piece 25 and an annulus 26 which serves as an inwardly extending flange for circumferentially engaging the under surface of the projection 12 of the plug 10, such engagement being maintained by aid of a helical spring 27 concealed within an axial offset 28 of the cap piece 25 and having its lower end seated in a recess of a filler piece 20 of insulation which occupies the hollow of the thimble 14 aforesaid. The two parts 25 and 26 of the hub 22 are secured to each other by means of screws 29—29 while the hub assembly is in turn secured to the central portion of the actuating element 23 by screws 30—30. More especially from Fig. III, it will be perceived that the cavity within the hub 22 is of such vertical depth as to allow limited universal tilting of the element 23 in opposition to the spring 27, about a changeable fulcrum established by contact of the flanges 12 and 26 at different points according to the region of application of pressure to the ring 24. It is also evident that the actuating element 23 may be tilted from the normal plane shown, either by elevating or depressing the ring 24 by a single finger of either hand, or it may be bodily displaced from its normal plane by engaging the same at two opposite points. When the actuating element 23 is tilted or displaced as explained, the inside of the top of the cap piece 25 of the hub 22 is brought into contact with the exposed annular surface 15 of the thimble 14, with the result that an electrical circuit is established through the conductor 18 to the signal, said actuating element 23 being by preference, grounded by reason of association of its hub with the ferrule 12 of the plug 10 and the adjacent parts of the steering column assembly. The actuating element 23 is held from rotating with the steering wheel by virtue of engagement of integral depending lugs 31—31 of its spokes 32—32 with the stationary sector 4, as clearly shown in Figs. I and II. It is to be especially noted from Fig. I that the spokes of the actuating element 23 are so arranged as to be without the scope of the sector 4 so that the movement of the levers 5 and 6 is entirely free from hindrance, although said levers are surrounded by the ring 24.

In practice, the separate hub member 22 of the actuating element 23 and the plug 10 are assembled as a unit, so that after being properly placed and secured by the set screw 21, all that remains to be done is to fasten the element 23 to its hub. In order to facilitate the latter operation, the central portion of the actuating element 23 is cut away as indicated at 35, so as to clear the hub of the spark lever 6, whereupon it may be secured by the screws 30—30.

In the type of steering column assembly illustrated in Fig. IV, the arc comprehended by the sector 4 is somewhat less in extent than that of the first described type, thus permitting the use of three spokes 32 in the actuating element 23 instead of two. Rotation of the element 23 is, however, prevented, as before, by engagement of depending lugs 31 of the spokes 32 with the radial arms of the sector 4.

In equipment where the cavity in the hub of the spark control lever 6 is too small in diameter to render the connection of the conductor 18 in the manner hereinbefore explained impossible or impracticable, an alternative form of attachment plug such as indicated by the numeral 40 in Fig. V is employed. This plug 40, it will be observed, corresponds generally to the shape of the plug 10 of Fig. III, and is similar, in that it comprises an outer metallic shell or ferrule 41 with an annular, laterally projecting flange 42 and an insulation lining 43 for the latter. However, here, instead of the thimble 14 and its annular contact surface 15, I substitute a disk 44 having secured in axial relation thereto by a screw 45, a cylindrical extension member or stem 46 which extends into the ferrule 41. This stem 46 is bored as shown to receive the end of the conductor 18 which is preferably secured by a set screw 47 set into the side of the plug 19. The spring 28 is functional in the manner already explained and the lower end of the same is in the present instance electrically insulated from the disk 44 by an interposed flanged button 48 adapted to rest on the screw 45.

In some cases, as shown in Fig. VI, the conductor 18 is already soldered to a metallic washer 50 seated with interposition of insulation 51 within the bottom of the cavity of the spark control lever hub. In order to establish electrical communication, a light helical spring 53 is compressed between the washer 50 and a shoulder of the stem 46. In all other respects, the plug structure here shown is identical with that of Fig. V.

From the foregoing, it will be seen that the improved circuit closing device of my invention is supported entirely independently of the steering wheel and may be readily applied to various standard types of steering column assemblies without requiring any changes whatever in any of their constituent parts.

Having thus described my invention, I claim:

1. A circuit controlling device, for use with a steering wheel and its column, comprising a metallic sleeve having a lateral flange, a thimble fitting said sleeve with interposition of insulation, said thimble having an insulate core and embodying an annular contact surface, an actuating element including a cap piece and an annulus for cooperation with the underside of the lateral flange aforesaid, and a helical spring interposed between the insulate core and an axial offset of the cap piece.

2. A circuit controlling device, for use with a steering wheel and its column, comprising a stationary metallic sleeve having an annular flange, a thimble fitting said sleeve with interposition of insulation, said thimble having an insulate core and embodying an annular contact surface, an actuating element including a cap piece and an annulus for engagement below the annular flange aforesaid, a helical spring between the insulate core and an offset concentric of the cap piece, and means effective to prevent relative rotation of the actuating element and thimble.

3. A circuit closing device, for use with a steering wheel, its column and stationary sector, comprising a stationary metallic sleeve having an annular flange, a thimble fitting said sleeve with interposition of insulation and affording clearance to accommodate a terminal connection, said thimble having an insulate core and embodying an annular contact surface, an actuating element including a cap piece and annulus for cooperation with the underside of the annular flange aforesaid, a helical spring interposed between the insulate core and an offset of the cap piece, and depending lugs on the actuating element for engaging the stationary sector to prevent relative rotation of the cap piece and thimble.

4. In a circuit controlling device for use with the steering wheel of an automobile and its column, the combination of a relatively broad flanged contact thimble and associate under-flanged cap-piece in insulated relation, said cap-piece supporting an attached actuating element in close proximity to the steering wheel whereby it may be tilted relative to the thimble to effect engagement with a contact surface thereof, and coaxial compressive means normally retaining said devices in spaced relation.

5. In a circuit controlling device for use with the steering wheel of an automobile and its column, the combination of a relatively broad flanged contact thimble, a cooperative cap-piece in closely spaced and insulated relation, an annular flange on the cap-piece adapted to engage below the periphery of the thimble flange to limit the degree of separation, an actuator element removably secured to the annular flange of the cap-piece aforesaid, and a compression spring between the thimble and a central offset in the cap-piece to maintain the same in spaced relation and parallelism, whereby slight tilting movement of the cap-piece relative to the thimble will effect circuit closing through a contact surface of the thimble aforesaid.

6. In combination, a vehicle steering wheel and an electric circuit closing switch mechanism seating centrally thereof on the top of the steering column, said mechanism including an invert contact thimble with a relatively broad flange, a similarly broad cooperative cap-piece having an annular flange engaging below but insulated from the aforesaid broad flange, a coil spring normally retaining the thimble and cap-piece in spaced relation and parallelism, and an annular non-rotatable element removably attached to the cap-piece and located closely adjacent the rim of the steering wheel so as to be operated by the hand while grasping said wheel and having connection to the cap-piece for tilting the same to cause circuit-closing engagement through a contact surface of the aforesaid flanged thimble and cap-piece.

In testimony whereof, I have hereunto signed my name at Stamford, Connecticut, this twenty-sixth day of November, 1921.

SAMUEL DAVIS ROBINS.